US012793014B2

(12) United States Patent
Li et al.

(10) Patent No.: US 12,793,014 B2
(45) Date of Patent: Nov. 10, 2026

(54) METHOD, APPARATUS, ELECTRONIC DEVICE, AND STORAGE MEDIUM FOR CONTROLLING USER STATE

(71) Applicant: Beijing Zitiao Network Technology Co., Ltd., Beijing (CN)

(72) Inventors: Tianyu Li, Beijing (CN); Lu Zhang, Beijing (CN); Ran Yan, Beijing (CN); Haidong Wang, Beijing (CN); Shuai Yang, Beijing (CN); Jian Xu, Beijing (CN); Chuanhao Zhan, Beijing (CN); Zhouyou Zhou, Beijing (CN); Kebang Feng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 78 days.

(21) Appl. No.: 18/573,882

(22) PCT Filed: Oct. 24, 2022

(86) PCT No.: PCT/CN2022/127060
§ 371 (c)(1),
(2) Date: Dec. 22, 2023

(87) PCT Pub. No.: WO2023/071988
PCT Pub. Date: May 4, 2023

(65) Prior Publication Data

US 2024/0311760 A1 Sep. 19, 2024

(30) Foreign Application Priority Data

Oct. 25, 2021 (CN) ........................ 202111240433.0

(51) Int. Cl.
*G06Q 10/101* (2023.01)

(52) U.S. Cl.
CPC ................................ *G06Q 10/101* (2013.01)

(58) Field of Classification Search
CPC ................................................ G06Q 10/101
See application file for complete search history.

(56) References Cited

U.S. PATENT DOCUMENTS 10,027,775 B1 * 7/2018 Mierau .................. H04L 67/54
2005/0125496 A1 6/2005 Thuerk et al.
(Continued)

FOREIGN PATENT DOCUMENTS

CN 102135875 A 7/2011
CN 102209081 A 10/2011
(Continued)

OTHER PUBLICATIONS

Thomas Kalischko, Electronic Performance Monitoring in the Digital Workplace: Conceptualization, Review of Effects and Moderators, and Future Research Opportunities, May 2021, p. 2-4 (Year: 2021).*
(Continued)

*Primary Examiner* — Ibrahim N El-Bathy
(74) *Attorney, Agent, or Firm* — Astute IP Law Group

(57) ABSTRACT

The disclosure provides a method, apparatus, electronic device, and storage medium for controlling a user state. In some embodiments, the disclosure provides a method for controlling the user state. The method is applied to collaborative office software and includes: determining, for a user of the collaborative office software, at least one user state as a preset user state in advance; cancelling activation of a further automatically activated user state during an activation period of the preset user state; or suspending activation of a further automatically activated user state during the activation period of the preset user state. The method in embodiments of the disclosure prevents the automatically
(Continued)

activated user state from replacing the preset user state, thereby improving the user experience.

18 Claims, 1 Drawing Sheet

(56) References Cited

U.S. PATENT DOCUMENTS

| | | | | |
|---|---|---|---|---|
| 2009/0100171 | A1* | 4/2009 | Haynes | G06F 15/173 709/224 |
| 2014/0164523 | A1 | 6/2014 | Bank et al. | |
| 2019/0387449 | A1 | 12/2019 | Li | |

FOREIGN PATENT DOCUMENTS

| | | | |
|---|---|---|---|
| CN | 104899084 | A | 9/2015 |
| CN | 106027798 | A | 10/2016 |
| CN | 106487410 | A | 3/2017 |
| CN | 106775200 | A | 5/2017 |
| CN | 107426425 | A | 12/2017 |
| CN | 113886212 | A | 1/2022 |
| WO | 2021203368 | A1 | 10/2021 |

OTHER PUBLICATIONS

International Search Report and Written Opinion, International Patent Application No. PCT/CN2022/127060, Dec. 19, 2022, with English translation of Search Report (11 pages).

Office Action issued in Chinese Patent Application No. 202111240433.0, Jun. 2, 2023, with machine translation (11 pages).

* cited by examiner

METHOD, APPARATUS, ELECTRONIC DEVICE, AND STORAGE MEDIUM FOR CONTROLLING USER STATE

CROSS-REFERENCE

This application is based on the Chinese Patent Application No. 202111240433.0, filed on Oct. 25, 2021, entitled "Method. Apparatus. Electronic Device and Storage Medium for Controlling User State", and claims priority of the Chinese patent application, the entirety of which is incorporated herein by reference.

FIELD

The present disclosure relates to the field of computer technology, and in particular to a method and an apparatus, an electronic device, and a storage medium for controlling a user state.

BACKGROUND

Users may set a user state when using collaborative office software. User states may include Do Not Disturb. Leave. In Meeting. Day Off. Busy, etc. Users may set a user state automatically or manually. By setting a user state, collaborative personnels may know whether the user is convenient to cooperate at this time.

SUMMARY

The present disclosure provides a method and an apparatus, an electronic device, and a storage medium for controlling a user state.

This disclosure adopts the following technical solution.

In some embodiments, the present disclosure provides a method for controlling a user state, which is applied to collaborative office software, the method including:

determining. for a user of the collaborative office software, at least one user state as a preset user state in advance; and cancelling activation of a further automatically activated user state during an activation period of the preset user state, or suspending activation of a further automatically activated user state during the activation period of the preset user state.

In some embodiments, the present disclosure provides an apparatus for controlling a user state, which is applied to collaborative office software, the apparatus:

a setting module configured to determine, for a user of the collaborative office software, at least one user state as a preset user state in advance; and a control module configured to cancel activation of a further automatically activated user state during an activation period of the preset user state, or suspend activation of a further automatically activated user state during the activation period of the preset user state.

In some embodiments, the present disclosure provides an electronic device including: at least one memory and at least one processor:

the at least one memory is configured to store program code, and the at least one processor is configured to call the program code stored in the at least one memory to perform the method described above.

In some embodiments, the present disclosure provides a computer-readable storage medium for storing program code that, when executed by an electronic device, causes the electronic device to perform the method described above.

The method for controlling a user state provided in the embodiment of the present disclosure is applied to collaborative office software, and it includes: determining, for one user of the collaborative office software, at least one user state as a preset user state in advance: during an activation period of the preset user state, cancelling activation of a further automatically activated user state, or during the activation period of the preset user state, suspending activation of a further automatically activated user state. This prevents the automatically activated user state from replacing the preset user state, thereby improving the user experience.

BRIEF DESCRIPTION OF THE DRAWINGS

In conjunction with the accompanying drawings and with reference to the following embodiments, the above and other features, advantages and aspects of the various embodiments of the present disclosure will become more apparent. Throughout the drawings, the same or similar reference numerals indicate the same or similar elements. It should be understood that the drawings are illustrative and the originals and elements are not necessarily drawn to scale.

DETAILED DESCRIPTION

Figure 1:
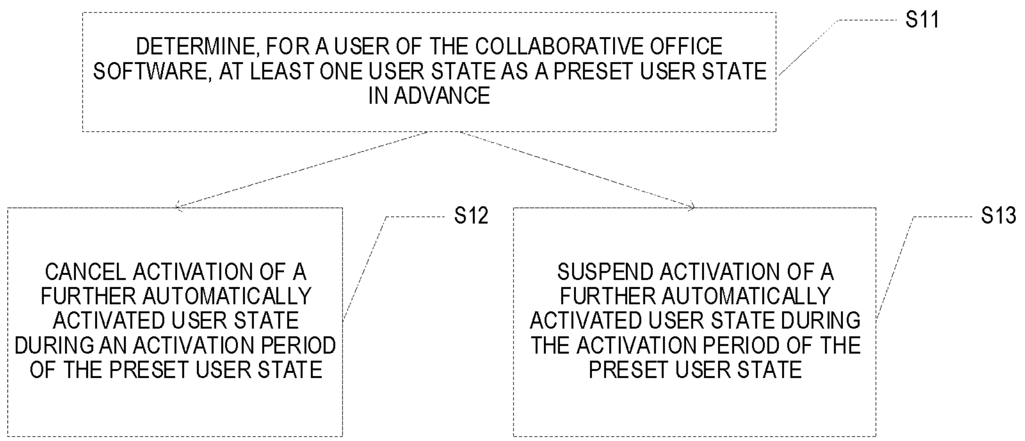
FIG. 1 is a flowchart of a method for controlling a user state according to an embodiment of the present disclosure.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are provided for illustrative purposes only and are not intended to limit the scope of protection of the present disclosure.

It should be understood that the various steps described in the method implementation of this disclosure can be executed in different orders and/or in parallel. In addition, the method implementation can include additional steps and/or the steps as shown may be omitted. The scope of this disclosure is not limited in this regard.

The term "including" and its variations as used herein are non-exclusive inclusion. i.e. "including but not limited to". The term "based on" means "at least partially based on". The term "one embodiment" means "at least one embodiment": the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of the messages or information interacted between multiple apparatuses in this public implementation are for illustrative purposes only, which are not intended to limit the scope of these messages or information.

The following will describe in detail the technical solution provided by the present disclosure in conjunction with the accompanying drawings.

When users use collaborative office software (such as work suite software products that integrate one or more of instant messaging IM, online documents, audio and video conferencing, calendars, etc., or independent collaborative office software such as collaborative online documents), a user state can be set so that collaborative workers may know whether it is convenient to work with the user. User states may include Vacation. Meeting. Busy. Leave. Do Not Disturb, etc. The user state nay be set manually or automatically. After the user sets a state, there may be a situation where the automatically activated state overrides the state set by the user, which is not in compliance with the user's expectations. For example, if the user has a meeting schedule from 3 to 4 o'clock, the user sets a Do Not Disturb state for one hour at 2:30, and at 3 o'clock, the user state is automatically set to In Meeting according to the meeting schedule. Thus, the user state is not in consistent with the user's expectations, and thus leads to insufficient user experience.

As shown in FIG. 1. FIG. 1 is a flowchart of a method for controlling a user state according to an embodiment of the present disclosure, which is applied to collaborative office software. The collaborative office software may be work suite products integrated with one or more of IM, online documents, audio and video conferencing, calendars, etc., or it may also be independent products such as online document software and audio and video conferencing. The method includes the following step S11, and one of steps S12 and S13.

S11, determining, for one user of the collaborative office software, at least one user state as a preset user state in advance.

S12, during an activation period of the preset user state, cancelling activation of a further automatically activated user state.

S13, during activation period of the preset user state, suspending activation of the a further automatically activated user state.

In some embodiments, the preset user state determined in advance may be any user state, such as Do Not Disturb. Busy. Leave, etc., without limitation. The preset user state is a type of user state set in advance, which can be configured by the system or set by the user. There may be an activation condition for the preset user state, for example, the activation condition may be an activation period. During the activation period, the system activates the preset user state to set the user state as the preset user state, and the activation period is a period during which the state is activated. Alternatively, in some embodiments, the preset user state can also be manually activated by the user. In some embodiments, after the activation condition of the preset user state is met, the preset user state is activated, that is, the user state is set to the preset user state. During the activation period of the preset user state, if the activation conditions of other automatically activated user states are met, other automatically activated user states are not activated. In some embodiments, other automatically activated user states that are cancelled may refer to automatically activated user states that meet the activation condition during the activation period of the preset user state. For example, the user sets the Do Not Disturb as the preset user state, and the activation period of the Do Not Disturb is from 3:00 to 4:00. If the user has a meeting from 3:30 to 4:00, the user state will be automatically set to In Meeting during 3:30 to 4:00 according to the user's schedule. However, since the user has already set the preset user state as "Do Not Disturb", the user state will not be set to "In Meeting" at 3:30. In some embodiments, the preset user state can be, for example. "Day Off".

In some embodiments of the present disclosure, a preset user state is set in advance, and the preset user state has a higher priority than other automatically activated states. After the preset user state is activated, activation of other automatically activated user states will be cancelled, thereby preventing the automatically activated user state from replacing the user state that the user wants to set, thereby improving the user experience.

In some embodiments, during the activation period of the preset user state, other automatically activated user states are suspended. In some embodiments, suspending the activation of other automatically activated user states includes: disactivating the preset user state during the activation period of the preset user state. After the preset user state ends, whether an activation condition of other automatically activated user state is met is determined at the current time. If it is are met, other automatically activated user state may continue to be activated. In some embodiments, if it is not met, other automatically activated user states will not be activated. In some embodiments, if the current time is within a time period from the start time to end time of the automatically activated user state, the activation condition is met. In other embodiments, other automatically activated user states that are cancelled will be deactivated, that is, after the preset user state ends, even if it is still within the time period from the start time to end time of the automatically activated user state that are cancelled, the automatically activated user state will not be activated again.

In some embodiments of the present disclosure, the activation of the user state includes automatic activation and manual activation: where, a priority of the manually activated user state is higher than that of the automatically activated user state. In some embodiments, the automatically activated user state may be a user state set automatically according to the user's schedule, and the manually activated state is a user state manually set by the user. The manually activated user state will replace the automatically activated user state, and when the automatically activated user state needs to be activated, it is necessary to determine whether the user state to be replaced is a manually activated user state. The automatically activated user state can only replace an automatically activated user state, it cannot replace a manually activated user state. By distinguishing the manually activated user state from the automatically activated user state to set the priority of the manually activated user state higher than that of the automatically activated user state, the user state has a priority, and thus avoiding the problem of insufficient user experience caused by automatic changes in the user state. In some embodiments, the priority of the manually activated state is the highest, which is higher than the priority of the preset user state.

In some embodiments of the present disclosure, the method also includes: if an activation condition of a first user state is met at a current time, determining a current user state that has been activated at the current time, wherein the first user state is an automatically activated user state: if the current user state is a manually activated user state, cancelling automatic activation of the first user state; if the current user state is the preset user state, cancelling automatic activation of the first user state; and if the current user state is not the manually activated user state or the preset user state, activating the first user state automatically.

In some embodiments, since the first user state is an automatically activated user state, and the priority of the automatically activated user state is lower than the preset user state and also lower than a manually activated user state, it is necessary to determine whether to activate the first user state based on the user state at the current time (current user state) before activating the automatically activated first user state. In some embodiments, if the current time is within a time period from the start time to the end time of the first user state, the activation condition of the first user state is met.

In other embodiments of the present disclosure, the method further include: if activation conditions of at least two second user states are met at a current time, determining a second user state with a latest start time from the at least two second user states according to start times of the at least two second user states; and activating the second user state with the latest start time: wherein the at least two second user states are automatically activated user states.

In some embodiments, at the current time, activation conditions of a plurality of automatically activated states may be met simultaneously, but only one user state may be set, so it is necessary to determine a user state to be activated. At this time, a second user state with a latest start time is activated. The start time refers to a start time of the automatically activated user state, which can be determined according to preset rules or the user's schedule. For example, according to the user's schedule, if the user has a meeting from 3 to 4 o'clock, the user state is set to In Meeting at 3 o'clock, and the 3 o'clock is the start time of the "In Meeting" state. It should be noted that the start time belongs to a time when the activation condition is met, and the time when the activation condition is met may also include other times. A late start time may indicate that the second user state is more special, which better meets the user's needs. For example, working time are from 9 to 18 o'clock, and meeting time is from 15 to 16 o'clock during the working hours, and the start time of the meeting time is late than the working time. A user state with a late start time often indicate that the state is more special, and thus a higher priority needs to be assigned to the state.

In some embodiments, after the second user state with the latest start time ends, the above steps can be repeated, that is, if the activation conditions of at least two second user states are met at the current time, a state that needs to be activated at the current time is determined based on the starting times of the at least two second user states. That is, the second user state that needs to be activated is determined from the remaining second user states that meet the activation condition, and the second user state with the latest start time may still be selected from the remaining second user states.

For example, a period from 1:00 to 5:00 is the activation period of an automatically activated user state A. 1:00 is the start time. 1:00 belongs to the period from 1:00 to 5:00, so the activation condition is met; and a period from 2:00 to 3:00 is another activation period of an automatically activated user state B. The user state A is activated from 1:00 to 2:00, the user state B is activated from 2:00 to 3:00, and from 3:00 to 5:00, the activation condition of user state A is met (the time is within the activation period), thus at this time, the user state A may continue to be activated.

In some embodiments of the present disclosure, if the number of second user states with the latest start time is not less than 2, a user state with the latest creation time in the second user states with the latest start time is activated.

In some embodiments, there may be two or more second user states with the same start time, which is the latest start time. At this time, it is necessary to compare the creation times of the second user states, the creation time is a time when the second user state is set. For example, the second user states are created according to the user's schedule. Based on the schedule created by the user on Monday, it is known that the user has a meeting from 15:00 to 16:00 on Tuesday, so a second user state "In Meeting" from 15:00 to 16:00 on Tuesday is created on Monday. Based on the schedule created by the user on Tuesday morning, it is known that the user does not want to be disturbed from 15:00 to 18:00 on Tuesday, so the second user state "Do Not Disturb" from 15:00 to 18:00 is created on Tuesday morning. The creation time of "Do Not Disturb" is different from that of the "In Meeting" but the start time is the same. Therefore. "Do Not Disturb" with a later creation time is selected as the state from 15:00 to 18:00. A later the creation time is more consistent with user requirements.

In some embodiments of the present disclosure, the method further includes: in response to an operation of manually activating a third user state, activating the third user state, cancelling all user states that meet an activating condition but are not the preset user state during an activation period of the third user state. In some embodiments, the manually activated user state has the highest priority because it best meets the user's needs. Therefore, during the activation period of the third user state, even if the activation conditions are met, the user states that are not the preset user state will not be activated. These user states will be cancelled. After the third user state ends, whether the activation conditions are met is continuously determined and individual user states are activated according to the priority of each user state.

In some embodiments, during activation period of the third user state, if there is a preset user state that meets the activation condition, the preset user state is not activated for the moment, and after the third user state ends, determining whether the activation condition of the preset user state is still met, and if it is still met, activating the preset user state. In some embodiments, the preset user state is a user state with the highest priority except the manually activated state. Therefore, after the third user state ends, whether the activation condition of the preset user state is met is continuously determined. If it is met, the preset user state is activated. Here, the determining whether the activation condition of preset user state is met includes: determining whether the current time is within a period from the start time to end time of the preset user state.

For example, the activation period of the third user state is from 3:00 to 5:00. If the preset user state is set from 1:00 to 6:00, the user state will be set to the preset user state from 1:00 to 3:00, and will be set to the third user state from 3:00 to 5:00, and will still be set to the preset user state from 5:00 to 6:00.

In some embodiments of the present disclosure, if the preset user state is already in an activation state when the third user state is manually activated, the third user state is still activated. In some embodiments, the manually activated third user state has the highest priority, therefore, even if a preset user state is already in an activation state when the third user state is activated, the third user state is activated, and at this time, the third user state can be temporarily inactivated. After the third user state ends, if the activation condition of the preset user state is still met, the preset user state will continue to be displayed. In other embodiments, the third user state can be activated and at the same time the display of the preset user state can be maintained, that is, the user has dual states.

In some embodiments disclosed herein, it also includes: deactivating all user states in response to an operation of manually deactivating the current user state. In some embodiments, the user's manual operation has the highest priority. When the user manually deactivates the user state, the state will no longer be automatically set. At this time, neither the automatically activated state nor the preset user state will not be activated until the user activate the state again or authorize to automatically activate the state.

In some embodiments of the present disclosure, the automatically activated state has a set activation period, and the activation condition of the automatic activated state includes: the current time is within the activation period.

In some embodiments of the present disclosure, the preset user state, the manually activated state, and the automatically activated state are distinguished, and different priorities are set for them, thereby solving the problem of insufficient user experience caused by persistent state conflicts and not affecting the user's manual setting of user state.

In order to clearly illustrate the priority relationship between an automatically activated user state, a manually activated user state, and a preset user state, the following examples are given.

When the automatically activated user state meets the activation condition, it is necessary to first determine whether the current user state at the current time is a preset user state or a manually activated user state. If the current user state is a manually activated user state or a preset user state, the automatic user state will be cancelled. If the current user state is empty or the current user state is another automatically activated user state, the user state will be activated automatically.

When the preset user state meets the activation condition, the current user state at the current time will also be determined. If the current user state is an automatically activated state or if it is empty, the preset user state will be activated. If the current user state is a manually activated state, the preset user state will not be activated temporarily. After the manually activated user state ends, whether the activation condition of the preset user state is still met is continuously determined. If it is still met, the preset user state will be activated.

When the user state is manually activated, no matter the current user state is an automatically activated user state or a preset user state, the manually activated user state will be activated. If the current user state is a preset user state, after the manually activated user state ends, the preset user state will continue to be activated if the activation condition of the preset user state is still met.

In addition, when manually activating a user state, the manually activated user state will still be activated if the current user state is another manually activated user state.

In some embodiments of the present disclosure also provides a user state control apparatus, applied to collaborative office software, the control apparatus includes:

a setting module configured to determine, for one user of the collaborative office software, at least one user state as a preset user state in advance; and a control module configured to cancel activation of a further automatically activated user state during an activation period of the preset user state: or suspend activation of a further automatically activated user state during the activation period of the preset user state.

In some embodiments of the present disclosure, the activation of the user state comprises automatic activation and manual activation: where, a priority of a manually activated user state is higher than a priority of an automatically activated user state.

In some embodiments of the present disclosure, the control module is also configured to:

if an activation condition of a first user state is met at a current time, determine a current user state that has been activated at the current time, wherein the first user state is an automatically activated user state;

if the current user state is a manually activated user state, cancel automatic activation of the first user state;

if the current user state is the preset user state, cancel automatic activation of the first user state; and if the current user state is not the manually activated user state or the preset user state, activate the first user state automatically.

In some embodiments of the present disclosure, the control module is also configured to:

if activation conditions of at least two second user states are met at a current time, determine a second user state with a latest start time from the at least two second user states according to start times of the at least two second user states; and activate the second user state with the latest start time: wherein the at least two second user states are automatically activated user states.

In some embodiments of the present disclosure, the control module is also configured to:

if the number of second user states with the latest start time is not less than 2, activate the second user state with the latest creation time in the second user states with the latest start time.

In some embodiments of the present disclosure, the control module is also configured to: activate the third user state, and cancel all user states that meet an activating condition but are not the preset user state during an activation period of the third user state, in response to an operation of manually activating a third user state.

In some embodiments of the present disclosure, the control module is also configured to: temporarily not activate the preset user state if the preset user state meets the activation condition, during activation period of the third user state, and after the third user state ends, determine whether the activation condition of the preset user state is still met, and if it is still met, activate the preset user state.

In some embodiments of the present disclosure, the control module is configured to still activate the third user state if the preset user state is already in an activation state when the third user state is manually activated.

In some embodiments of the present disclosure, the control module is also configured to activate the third user state and temporarily cancel the preset user state, if the preset user state is already in the activation state when the third user state is manually activated: or.

if the preset user state is already in the activation state when the third user state is manually activated, activate the third user state and keep displaying the preset user state.

In some embodiments of the present disclosure, the control module is also configured: deactivate all user states in response to an operation of manually deactivating the current user state.

In some embodiments of the present disclosure, the cancelling activation of a further automatically activated user state includes: after the preset user state ends, even if it is still within a period from start time to end time of the automatically activated user state that has been cancelled, not disactivating the automatically activated user state that has been cancelled: or, the suspending activation of a further automatically activated user state comprises: after the preset user state ends, determining whether the current time meets an activation condition of the other automatically activated user state that has been suspended, and if so, activating the further automatically activated user state that has been suspended.

For the embodiments of the device, since they basically correspond to the method embodiments, for the relevant parts, a part of description of the method embodiments may be referred to. The device embodiments described above are only illustrative, and the module described as a separate module may or may not be separated. Some or all of the modules can be selected according to actual needs to achieve the purpose of implementing the technical solutions of the embodiments. Those skilled in the art may understand and implement the solutions without creative labor.

The method and apparatus of the present disclosure have been described based on the embodiments and application examples as above. In addition, the present disclosure also provides a terminal and a computer-readable storage medium, which are described below. The electronic device in the embodiment of the present disclosure includes at least one memory and at least one processor: where the at least one memory is configured to store program code, and the at least one processor is configured to call the program code stored in the at least one memory to perform any of the above method for controlling a user state. The electronic device will be described below.

Figure 2:
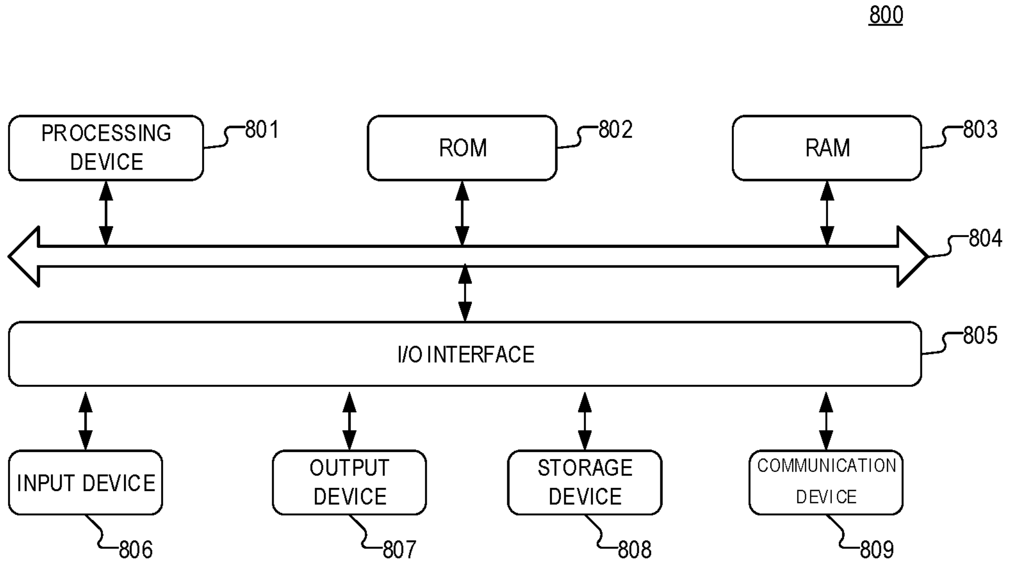
FIG. 2 is a structural schematic diagram of the electronic device according to the embodiment of the present disclosure.

Referring now to FIG. 2, it is a structural schematic diagram of an electronic device (e.g., an terminal device or a server) 800 suitable for implementing the embodiment of the present disclosure. The terminal device in the embodiment of the present disclosure may include but is not limited to mobile terminals such as mobile phones, laptops, digital broadcast receivers. PDAs (Personal Digital Assistants). PADs (tablet computers). PMPs (portable multimedia players), car-mounted terminals (such as car navigation terminals), etc. and fixed terminals such as digital televisions (TV), desktop computers, etc. The electronic device shown in the drawing is only an example and should not bring any limitation on the functionality and scope of use of the embodiment of the present disclosure.

The electronic device 800 may include a processing device (such as a central processing unit, graphics processing unit, etc.) 801, which may perform various appropriate actions and processes based on programs stored in Read-Only Memory (ROM) 802 or loaded from storage device 808 into Random Access Memory (RAM) 803. In the RAM 803, various programs and data necessary for the operation of the electronic device 800 are also stored. The processing device 801. ROM 802, and RAM 803 are connected to each other through a bus 804. An Input/Output I/O interface 805 is also connected to the bus 804.

Typically, the following devices may be connected to I/O interface 805; an input device 806 including, for example, a touch screen, a touchpad, a keyboard, a mouse, a camera, a microphone, an accelerometer, a gyroscope, etc.; an output device 807 including a liquid crystal display (LCD), a speaker, a vibrator, etc.; a storage device 808 including a magnetic tape, a hard disk, etc.; and a communication device 809. The communication device 809 may allow the electronic device 800 to communicate with other devices wirelessly or wirelessly to exchange data. Although the drawing shows an electronic device 800 with a plurality of devices, it shall be understood that it is not required to implement or have all of the devices shown. More or fewer devices can be implemented or provided instead.

In some embodiments of the present disclosure, a computer-readable storage medium is also provided. The computer-readable storage medium is configured to store program code. When the program code is executed by an electronic device, it causes the electronic device to perform the method for controlling the user state as above. In particular, according to embodiments of the present disclosure, the process described above with reference to the flowchart can be implemented as a computer software program. For example, an embodiment of the present disclosure includes a computer program product that includes a computer program carried on a computer-readable storage medium, where the computer program includes program code for performing the method shown in the flowchart. In such an embodiment, the computer program can be downloaded and installed from a network through the communication device 809, or installed from the storage device 808, or installed from the ROM 802. When the computer program is executed by the processing device 801, the above functions defined in the method of the embodiment of the present disclosure are performed.

It should be noted that the computer-readable storage medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable storage medium may be transmitted using any suitable medium, including but not limited to: wires, optical cables. RF (radio frequency), etc. . . . or any suitable combination thereof.

In some embodiments, clients and servers can communicate using any currently known or future developed network protocol such as HTTP (HyperText Transfer Protocol), and can be interconnected with any form or medium of digital data communication (such as communication networks). Examples of communication networks include local area networks ("LANs"), wide area networks ("WANs"), internetworks (such as the Internet), and end-to-end networks (such as ad hoc end-to-end networks), as well as any currently known or future developed networks.

The computer-readable storage medium can be included in the electronic device, or it can exist alone without being assembled into the electronic device.

The above-mentioned computer-readable storage medium carries one or more programs, and when the above-mentioned one or more programs are executed by the electronic device, the electronic device: performs the method of the disclosure as above.

Computer program codes for performing the operations of the present disclosure may be written in one or more programming languages or a combination thereof, including Object Oriented programming languages-such as Java. Smalltalk. C++, and also conventional procedural programming languages-such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network-including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case.

The functions described herein above can be performed at least in part by one or more hardware logic components. For example, without limitation, exemplary types of hardware logic components that may be used include: Field Programmable Gate Arrays (FPGAs). Application Specific Integrated Circuits (ASICs). Application Specific Standard Parts (ASSPs). System on Chip (SOCs). Complex Programmable Logic Devices (CPLDs), and so on.

In the context of this disclosure, a computer readable storage medium can be a tangible medium that may contain or store programs for use by or in conjunction with instruction execution systems, apparatuses, or devices. A computer readable storage medium may be a machine-readable signal medium or a machine-readable storage medium. A computer readable storage medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, there is provided a method for controlling a user state, the method is applied to collaborative office software, the method including:

determining. for one user of the collaborative office software, at least one user state as a preset user state in advance;

during an activation period of the preset user state, cancelling activation of a further automatically activated user state: or, during activation period of the preset user state, suspending activation of a further automatically activated user state.

According to one or more embodiments of the present disclosure, there is provided a method for controlling a user state, where activation of the user state includes automatic activation and manual activation:

where, a priority of a manually activated user state is higher than a priority of an automatically activated user state.

According to one or more embodiments of the present disclosure, there is provided a method for controlling a user state, the method further including:

if an activation condition of a first user state is met at a current time, determining a current user state that has been activated at the current time, wherein the first user state is an automatically activated user state;

if the current user state is a manually activated user state, cancelling automatic activation of the first user state;

if the current user state is the preset user state, cancelling automatic activation of the first user state; and if the current user state is not the manually activated user state or the preset user state, activating the first user state automatically.

According to one or more embodiments of the present disclosure, there is provided a method for controlling a user state, the method further including: if activation conditions of at least two second user states are met at a current time, determining a second user state with a latest start time from the at least two second user states according to start times of the at least two second user states; and activating the second user state with the latest start time: wherein the at least two second user states are automatically activated user states.

According to one or more embodiments of the present disclosure, there is provided a method for controlling a user state, the method further including: if the number of second user states with the latest start time is not less than 2, activating the second user state with the latest creation time in the second user states with the latest start time.

According to one or more embodiments of the present disclosure, there is provided a method for controlling a user state, the method further including: in response to an operation of manually activating a third user state, activating the third user state, and canceling all user states that meet an activating condition but are not the preset user state during an activation period of the third user state.

According to one or more embodiments of the present disclosure, there is provided a method for controlling a user state, where, during activation period of the third user state, if the preset user state meets the activation condition, temporarily not activating the preset user state, and after the third user state ends, determining whether the activation condition of the preset user state is still met, and if it is still met, activating the preset user state.

According to one or more embodiments of the present disclosure, there is provided a method for controlling a user state, where, if the preset user state is already in the activation state when the third user state is manually activated, activating the third user state and temporarily cancelling the preset user state; or.

if the preset user state is already in the activation state when the third user state is manually activated, activating the third user state and keep displaying the preset user state.

According to one or more embodiments of the present disclosure, there is provided a method for controlling a user state, where, if the preset user state is already in an activation state when the third user state is manually activated, still activating the third user state.

According to one or more embodiments of the present disclosure, there is provided a method for controlling a user state, the method further including: in response to an operation to manually close the current user state, closing all user states.

According to one or more embodiments of the present disclosure, there is provided a method for controlling a user state, the cancelling activation of a further automatically activated user state includes: after the preset user state ends, even if it is still within a period from start time to end time of the automatically activated user state that has been cancelled, not activating the automatically activated user state that has been cancelled; or, the suspending activation of a further automatically activated user state comprises: after the preset user state ends, determining whether the current time meets an activation condition of the other automatically activated user state that has been suspended, and if so, activating the further automatically activated user state that has been suspended.

According to one or more embodiments of the present disclosure, there is provided an apparatus for controlling a user state, applied to collaborative office software, the apparatus including:

a setting module configured to determine, for one user of the collaborative office software, at least one user state as a preset user state in advance; and a control module configured to cancel activation of other automatically activated user states during an activation period of the preset user state: or suspending activation of other automatically activated user states during the activation period of the preset user state.

According to one or more embodiments of the present disclosure, there is provided an electronic device, including:

at least one memory and at least one processor;

the at least one memory is configured to store program code, and the at least one processor is configured to call the program code stored in the at least one memory to perform the method of any one of the methods described above.

According to one or more embodiments of the present disclosure, a computer-readable storage medium is provided, the computer-readable storage medium is configured for storing program code that, when executed by an electronic device, causes the electronic device to perform any one of the methods described above.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although multiple operations are depicted in a specific order, this should not be understood as requiring these operations to be performed in the specific order shown or in a sequential order. In certain environments, multitasking and parallel processing may be advantageous. Similarly, although multiple implementation details are included in the above discussion, these should not be construed as limiting the scope of the present disclosure. Some features described in the context of individual embodiments can also be implemented in combination in a single embodiment. Conversely, multiple features described in the context of a single embodiment can also be implemented in multiple embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

We claim:

1. A method for controlling a user state, wherein the method is applied to collaborative office software and comprises:

determining, by an electronic device, for a user of the collaborative office software, at least one user state as a preset user state in advance, wherein activation of a user state comprises automatic activation and manual activation, and wherein the preset user state has a higher priority than an automatically activated user state;

monitoring, by the electronic device during an activation period of the preset user state, whether an activation condition of a further automatically activated user state is met; and in response to determining, based on the monitoring, that the activation condition of the further automatically activated user state is met during the activation period of the preset user state, performing, by the electronic device based on the higher priority of the preset user state over the further automatically activated user state, one of:

cancelling, by the electronic device, activation of the further automatically activated user state, or suspending, by the electronic device, activation of the further automatically activated user state and after the preset user state ends, activating the further automatically activated user state if the activation condition is met; and wherein if the preset user state is already in an activation state at the time that a third user state is manually activated, the third user state is still activated by the electronic device.

2. The method of claim 1, wherein a priority of a manually activated user state is higher than a priority of an automatically activated user state.

3. The method of claim 1, further comprising:

if an activation condition of a first user state is met at a current time, determining a current user state that has been activated by the current time, wherein the first user state is an automatically activated user state;

if the current user state is a manually activated user state, cancelling automatic activation of the first user state;

if the current user state is the preset user state, cancelling automatic activation of the first user state; and if the current user state is not a manually activated user state or the preset user state, activating the first user state automatically.

4. The method of claim 1, further comprising:

if activation conditions of at least two second user states are met at a current time, determining a second user state with a latest start time from the at least two second user states based on start times of the at least two second user states; and activating the second user state with the latest start time; wherein the at least two second user states are automatically activated user states.

5. The method of claim 4, further comprising:

if the number of second user states with the latest start time is not less than 2, activating the second user state with a latest creation time in the second user states with the latest start time.

6. The method of claim 1, further comprising:

in response to an operation of manually activating a third user state, activating the third user state, and cancelling all user states that meet an activating condition but are not the preset user state during an activation period of the third user state.

7. The method of claim 6, wherein during the activation period of the third user state, the preset user state is not activated even if the preset user state meets the activation condition; and after the third user state ends, whether the activation condition of the preset user state is still met is determined and the preset user state is activated in accordance with a determination that the activation condition of the preset user state is still met.

8. The method of claim 1, wherein, if the preset user state is already in the activation state at the time that the third user state is manually activated, activating the third user state and temporarily cancelling the preset user state; or if the preset user state is already in the activation state at the time that the third user state is manually activated, activating the third user state and keep displaying the preset user state.

9. The method of claim 1, further comprising:

deactivating all user states in response to an operation of manually deactivating the current user state.

10. The method of claim 1, wherein, the cancelling activation of a further automatically activated user state comprises: after the preset user state ends, even if it is still within a period from a start time to an end time of the automatically activated user state that has been cancelled, disactivating the automatically activated user state that has been cancelled; or the suspending activation of a further automatically activated user state comprises: after the preset user state ends, determining whether the current time meets an activation condition of the further automatically activated user state that has been suspended, and activating the further automatically activated user state that has been suspended if the current time meets the activation condition.

11. An electronic device, comprising:

at least one memory and at least one processor;

wherein the at least one memory is configured to store program codes, and the at least one processor is configured to invoke the program codes stored in the at least one memory to perform a method for controlling a user state comprising:

determining, by an electronic device, for a user of the collaborative office software, at least one user state as a preset user state in advance, wherein activation of a user state comprises automatic activation and manual activation, and wherein the preset user state has a higher priority than an automatically activated user state;

monitoring, by the electronic device during an activation period of the preset user state, whether an activation condition of a further automatically activated user state is met; and in response to determining, based on the monitoring, that the activation condition of the further automatically activated user state is met during the activation period of the preset user state, performing, by the electronic device based on the higher priority of the preset user state over the further automatically activated user state, one of:

cancelling, by the electronic device, activation of the further automatically activated user state, or suspending, by the electronic device, activation of the further automatically activated user state and after the preset user state ends, activating the further automatically activated user state if the activation condition is met; and wherein if the preset user state is already in an activation state at the time that a third user state is manually activated, the third user state is still activated by the electronic device.

12. The electronic device of claim 11, wherein a priority of a manually activated user state is higher than a priority of an automatically activated user state.

13. The electronic device of claim 11, further comprising:

if an activation condition of a first user state is met at a current time, determining a current user state that has been activated by the current time, wherein the first user state is an automatically activated user state;

if the current user state is a manually activated user state, cancelling automatic activation of the first user state;

if the current user state is the preset user state, cancelling automatic activation of the first user state; and if the current user state is not a manually activated user state or the preset user state, activating the first user state automatically.

14. The electronic device of claim 11, further comprising:

if activation conditions of at least two second user states are met at a current time, determining a second user state with a latest start time from the at least two second user states based on start times of the at least two second user states; and activating the second user state with the latest start time; wherein the at least two second user states are automatically activated user states.

15. The electronic device of claim 14, further comprising:

if the number of second user states with the latest start time is not less than 2, activating the second user state with a latest creation time in the second user states with the latest start time.

16. The electronic device of claim 11, further comprising:

in response to an operation of manually activating a third user state, activating the third user state, and cancelling all user states that meet an activating condition but are not the preset user state during an activation period of the third user state.

17. The electronic device of claim 15, wherein during the activation period of the third user state, the preset user state is not activated even if the preset user state meets the activation condition; and after the third user state ends, whether the activation condition of the preset user state is still met is determined and the preset user state is activated in accordance with a determination that the activation condition of the preset user state is still met.

18. A non-transitory computer-readable storage medium for storing program codes, the program codes, when executed by an electronic device, causing the electronic device to perform a method for controlling a user state comprising:

determining, by an electronic device, for a user of the collaborative office software, at least one user state as a preset user state in advance, wherein activation of a user state comprises automatic activation and manual activation, and wherein the preset user state has a higher priority than an automatically activated user state;

monitoring, by the electronic device during an activation period of the preset user state, whether an activation condition of a further automatically activated user state is met; and in response to determining, based on the monitoring, that the activation condition of the further automatically activated user state is met during the activation period of the preset user state, performing, by the electronic device based on the higher priority of the preset user state over the further automatically activated user state, one of:

cancelling, by the electronic device, activation of the further automatically activated user state, or suspending, by the electronic device, activation of the further automatically activated user state and after the preset user state ends, activating the further automatically activated user state if the activation condition is met; and wherein if the preset user state is already in an activation state at the time that a third user state is manually activated, the third user state is still activated by the electronic device.

* * * * *